March 19, 1963 R. I. MOORE 3,082,017
WHEEL SUSPENSION WITH POLYGONAL SPRING SUPPORT
Filed Sept. 6, 1960 2 Sheets-Sheet 1
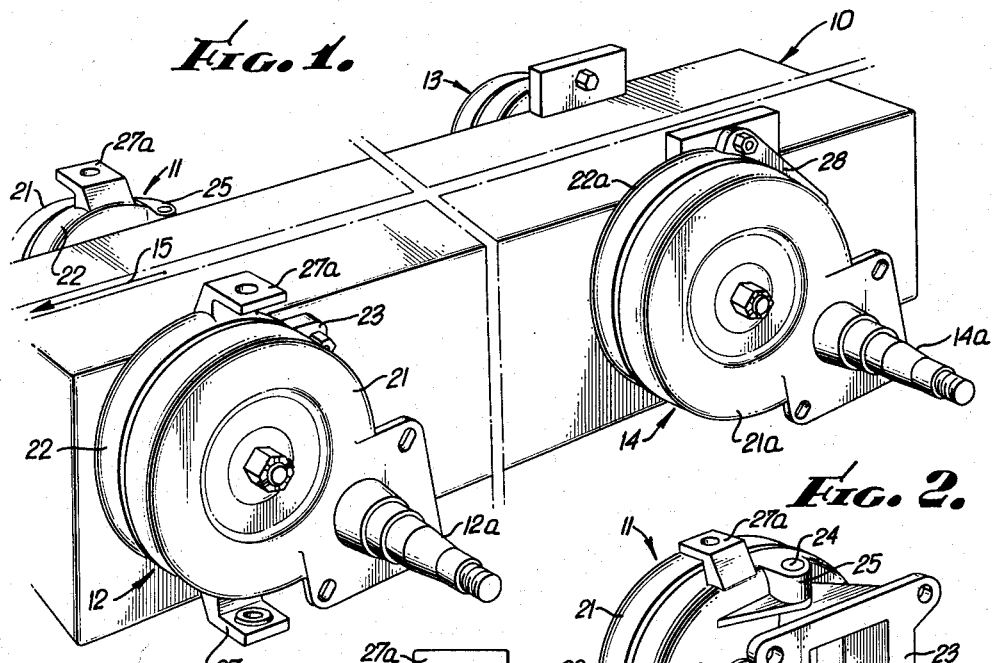
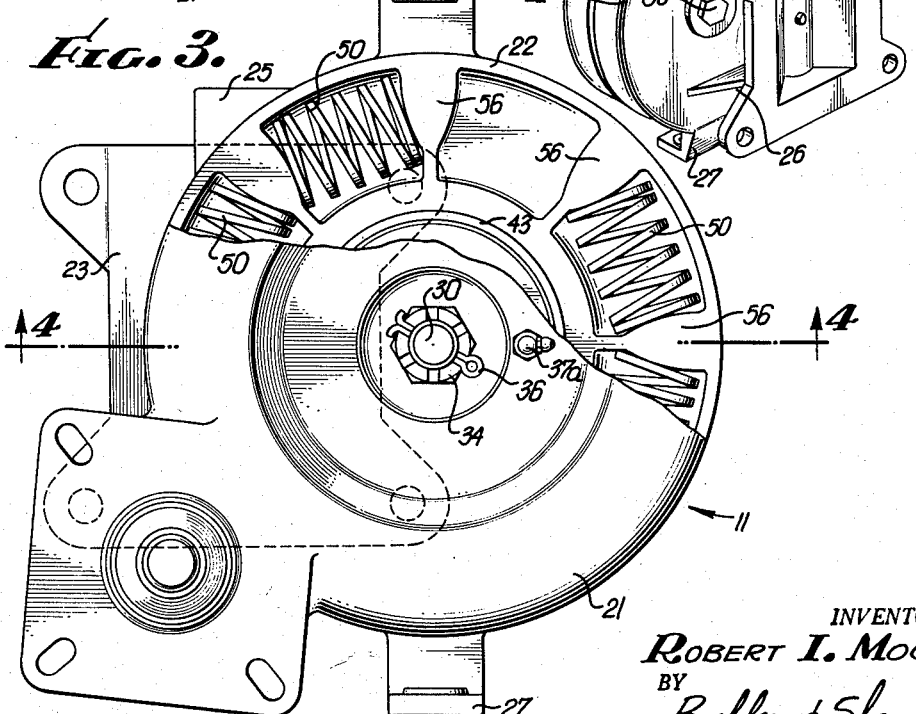
INVENTOR.
ROBERT I. MOORE
BY
Beehler & Shanahan
ATTORNEYS.

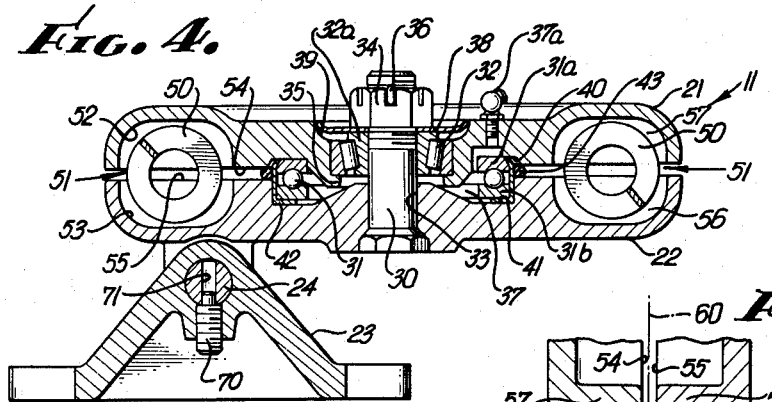
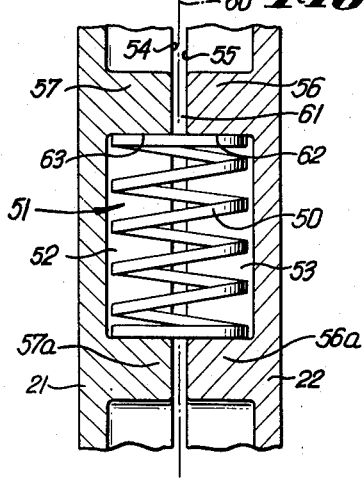
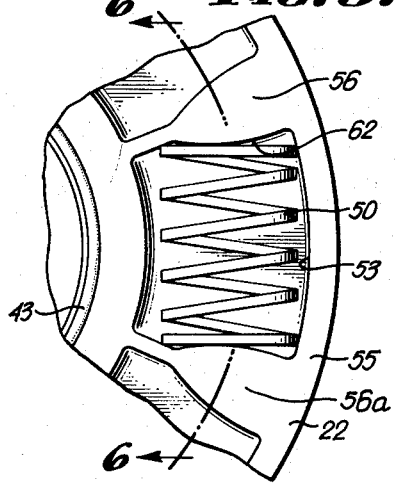
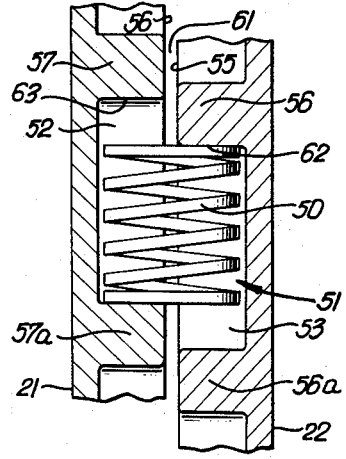
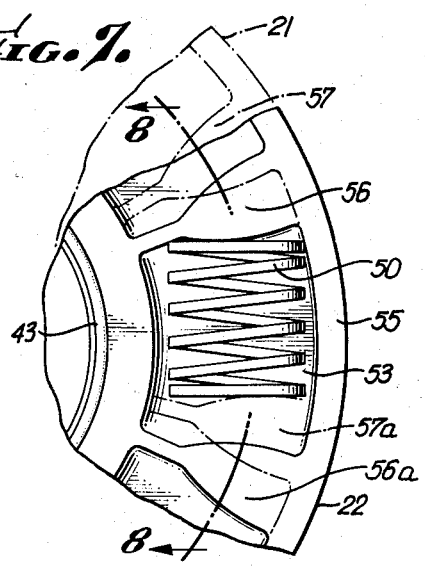

United States Patent Office 3,082,017
Patented Mar. 19, 1963

3,082,017
WHEEL SUSPENSION WITH POLYGONAL
SPRING SUPPORT
Robert I. Moore, Arleta, Calif., assignor to Aerol Co.,
Inc., Los Angeles, Calif., a corporation of California
Filed Sept. 6, 1960, Ser. No. 54,179
8 Claims. (Cl. 280—96.2)

This invention relates to shock-absorbing wheel suspensions for platform trucks, dollies, and the like, and more particularly to a wheel suspension in which helical shock-absorbing springs are disposed with their axes lying on the periphery of a polygon having its center at the axis of rotation of a wheel-carrying arm. The helical springs are confined in spring cavities formed of two circular half-housings, one of which is rotatable with the wheel-carrying arm about a common axis. The springs are compressed longitudinally by relative rotation of the two members between partial seats on opposite sides of the spring axis at each end of the spring. A preferred and important feature of novelty is the provision of radial webs which present a convex spring seat at each end of the spring so that the springs experience very nearly axial compression, without any significant arcuate distortion of the axis.

Manually pulled, four-wheel, hand trucks find widespread utility in both military and industrial use for the transport of heavy objects. The wheels or casters on the better quality trucks are provided with some type of springy shock-absorbing suspension in order to provide a substantial degree of protection of the load from the shocks transmitted through the wheels or casters as they encounter irregularities in the ground surface. Heavy and very valuable equipment can be severely damaged by the direct transmission of shocks through rigidly mounted wheels and the truck platform to the load itself.

The optimum "softness" or "hardness" of the shock-absorbing suspension will vary from load to load, depending upon such factors as the gross weight of the load, the maximum forces it can withstand without damage, the speed at which the dolly is to be pushed, and the character of the ground surface over which the wheels are to roll. Unfortunately, wheel suspensions of the past have generally had one characteristic spring construction, which was determined once and for all at the factory. Thereafter, although the truck might be satisfactory for one particular load transport usage, it would be almost worthless for absorbing shocks for lighter loads, or too weak to carry a heavy load without complete collapse of the shock-absorbing spring system. In a few instances, wheel suspensions have been designed with adjustable or variable spring characteristics; but, in general, these have failed to have the ruggedness and simplicity required of wheel suspensions in typical truck usage.

It is a major object of the present invention to provide an extremely rugged shock-absorbing wheel suspension which can be varied in spring characteristic by the addition or subtraction of standard spring units.

It has been common in the past to achieve shock-absorbing spring action by means of ground-end helical coil springs mounted in various ways to resist the rotation of a wheel carrying arm about a suspension axis, as the wheel experiences rolling shock. Substantial loads have been carried by means of relatively large springs, of substantial diameter and length. Unfortunately, many such suspensions have required springs of such size that the spring itself experienced some arcuate deflection in addition to longitudinal spring deflection. Such arcuate deflection is undesirable, since helical springs are more likely to break or fatigue when subject to arcuate deflection which is substantial in comparison with the longitudinal compression, helical springs being primarily designed for the latter type of deformation.

It is a major object of the present invention to achieve the effects of great spring strength with relatively small springs, and to deform these springs under load conditions with a deformation which is substantially all longitudinal, with arcuate deflection, if any, to be sufficiently small to have negligible effects on the spring.

It has also been proposed in the past, to achieve strong springing action by means of a number of springs in parallel. This has usually been accompanied by the disadvantage of having a relatively bulky spring box with a large number of springs with axes side by side. It is an important object of the present invention to provide parallel spring action without parallel arrangement of the spring axes.

The design of a relatively compact wheel suspension puts certain limitations on the size of spring which may be used. In most wheel suspensions of the past, it was thought necessary to provide for seating each ground-end of the spring over the entire spring end area, with the result that bulky design was required.

It is an important object of the present invention to provide a wheel suspension with the spring confined in such a manner that efficient longitudinal compression of the spring can be achieved with seating over slightly less than half of the spring at each end on each of the two relatively movable members respectively.

Wheel suspensions of the type to which this invention relates are used under extremely adverse conditions, often with the entire suspension actually dragging the ground and picking up dirt which could be extremely injurious to the suspension mechanism if allowed to penetrate to the areas at which the relatively movable parts have their bearing surfaces. It is an important object of the present invention to provide an entirely enclosed bearing and lubricant housing in the central part of the wheel suspension, entirely surrounded by spring housing portions.

In most wheel suspensions of the past, the springs have offered less resistance to rebound than to load deformation. It is an important advantage of the present invention that the suspension offers equal shock-absorbing resistance to both loading deflection and rebound.

Although the invention is adapted to be used on both non-steerable and steerable types of wheel suspensions, it has important advantages in wheel suspensions of the steerable type, since the king pin mounting is provided with a web structure extending horizontally from a point forward to the suspension axis to a point to the rear of the axis of suspension.

The foregoing and other objects and advantages of the invention will be understood from the following description of one preferred embodiment, taken in connection with the accompanying drawings, in which:

FIG. 1 is a perspective view of a typical truck platform or body, on which are mounted four wheel suspensions constructed according to the invention, two steerable front wheel suspensions and two non-steerable rear wheel suspensions. The wheels are omitted and the truck body partially broken away in order to reveal details of the wheel suspension design;

FIG. 2 is a perspective view of the inboard side of the steerable caster of FIG. 3;

FIG. 3 is a side elevational view of a wheel suspension constructed according to the invention, the illustrated wheel suspension being of the steerable type, and being partially broken away to reveal the disposition of the shock-absorbing springs;

FIG. 4 is a sectional view taken in the planes defined by the lines 4—4, as viewed in the direction of the arrows 4—4 in FIGURE 3;

FIG. 5 is an enlarged detail view of a part of a spring cavity formed by a recess in the surface of one of the members of the wheel suspension assembly, as seen looking directly into the recess;

FIG. 6 is a sectional view of the spring cavity of FIG. 5, showing the position assumed by the spring when it rests, as viewed in the direction of the arrow 6—6, in FIG. 5, along the curved surface defined by the line 6—6;

FIG. 7 is a view corresponding to FIG. 5, but showing the position assumed by the spring when compressed by the relative rotation of the members of the wheel suspension; and FIG. 8 is a cross-sectional view of one of the spring cavities of FIGURE 7, as seen in the direction of the arrows 8—8 and viewed along the curve surface defined by the line 8—8, showing one of the shock-absorbing springs as it appears compressed between the half spring seat of one wheel suspension member and a half spring seat of the other wheel suspension member when these two members are rotated relative to one another about the wheel suspension axis.

In FIGURE 1, the numeral 10 indicates generally a truck platform having a pair of front, steerable wheel suspensions 11 and 12, and a pair of rear, non-steerable wheel suspensions 13 and 14, said truck being adapted to be pulled in the direction of the arrow 15. The novelty of the invention resides in the wheel suspension only, and its use is not restricted to any particular type of wheel. Consequently, the wheels have been omitted, but their mounting locations are shown by the wheel axles 12(a) and 14(a).

As illustrated in FIGURE 1, the wheel suspensions are adapted to be used on a dolly which is pulled from in front, but it will be understood that the wheel suspensions are not limited in application to a towed arrangement. Thus, the steerable wheel suspensions may be mounted at the rear of platform 10 for pushing; also, the mode of mounting would be different for steering from within the truck itself, as is well known to those familiar with the steering linkages and wheel suspensions of automobiles.

It will seen from FIGURE 1 that the principal externally visible parts of the wheel suspension 12 are an outboard wheel carrying member 21, an inboard mounting bracket member 22, and a king pin mounting bracket 23.

FIGURE 2 shows an inboard view, in perspective, of a steerable suspension (in this instance, wheel suspension 11) which shows that the mounting bracket member 22 is steerably hinged to king pin bracket 23 by means of a king pin 24.

King pin 24 is journaled at the upper and lower ends in upper and lower king pen bearing mounts 25 and 26, which are integral parts of the iron casting comprising mounting bracket member 22.

Preferably, the king pin 24 is supported in the king pin bracket 23 with its axis at a camber angle of one or two degrees from the vertical, so as to place the upper edge of each steerable wheel slightly outboard of its lower edge. The same steerable wheel suspensions will serve for both right and left wheels, since the direction of camber can be reversed by inverting mounting bracket member 22.

To accommodate such inversion, and resultant interchangeability of right and left steerable wheel suspensions, the mounting bracket member 22 is provided with diametrically opposite tie rod connections 27 and 27a. Ordinarily, the lower tie rod connection 27a on each side of the steerable end of the dolly (the front in the embodiment illustrated) will be connected together by means of a steering tie rod.

The non-steerable wheel suspensions, such as suspensions 13 and 14 seen in FIGURE 1, have an outboard wheel carrying member 21(a) and an inboard mounting bracket member 22(a), which are substantially the same construction as the wheel carrying member 21 and mounting bracket member 22 of the steerable wheel suspension 12, except that mounting bracket 22(a) is mounted rigidly to the truck platform 10 by means of integral bolt flanges 28, without any provision for a king pin or king pin bracket, since no steering rotation is required. Correspondingly, no tie rod connections 26 or 27 are needed on the mounting bracket 22(a) of non-steerable wheel suspension 14.

FIGURES 3 and 4 show the manner in which the wheel carrying member 21 is rotatably mounted on the mounting bracket member 22 by means of a suspension pin 30, ball bearing 31, and tapered roller bearing 32. The suspension pin 30 is non-rotatably mounted in a bore 33 at the center of mounting bracket 22. The opposite end of suspension pin 30 threadably receives a nut 34 which transmits a force, through bearing 32, and annular shoulder 35 on the inboard side of wheel carrying member 21, to hold wheel carrying member 21 in tight assembly with mounting bracket member 22, both seating against their common thrust bearing 31. Nut 34 may be retained in position by a cotter pin 36.

It is a preferred feature of the invention that the thrust ball bearing 31 and the counter-thrust roller bearing 32 are securely sealed against the penetration of wear-producing particles from the exterior, but are continuously supplied with lubricant from a common internal reservoir 37 in the form of an annular space encircling suspension pin 30 and housed partly by the central portions of mounting bracket member 22 and wheel carrying member 21. Lubricant reservoir 37 may be conveniently replenished by means of an outboard grease fitting 37a mounted in wheel carrying member 21.

The tapered roller counter-thrust bearing 32 is protected by a wafer or lip seal 38 encircling the suspension pin 30 under its nut 34 and retained against the inner race 32(a) of bearing 32, with its outer edges or lips in contact with the circular periphery of the bearing recess 39, which is provided in the center of wheel carrying member 21 for the reception of bearing 32.

Ball bearing 31 is coaxial with suspension pin 30 and has its outboard race 31(a) and inboard race 31(b) seated in annular recesses 40 and 41 in wheel carrying member 21 and mounting bracket member 22 respectively.

The ball bearing 31 is protected by a ring-shaped bearing cover 42 and an O-ring seal 43.

It will be seen from the foregoing description that although the wheel carrying member 21 is held tightly in assembly with mounting bracket 22, it is free to rotate relative to mounting bracket 22 about a suspension axis, which is the common axis of suspension pin 30, bearing 31, bearing 32, and the annular recesses provided for bearings and lubricant.

Relative rotation of the two members 21 and 22 is resisted by a plurality of helical springs 50 (the particular embodiment illustrated has provision for eight such springs) which are housed in spring cavities, which may be referred to generally by the numeral 51 (see FIGURE 4), which are formed by mating recesses 52 and 53 in the mating surfaces 54 and 55 of wheel carrying member 21 and mounting bracket member 22, respectively. Each spring 50 engages both mounting bracket member 22 and wheel carrying member 21, since it is, at all times, seated half in recess 53 and half in recess 52, against specially shaped radial seating webs 56.

FIGURES 5 and 6 show the position of spring 50 in its cavity 51 (formed of recesses 52 and 53) under no-load conditions, with the radial spring seating webs 56 of mounting bracket 22 in mating alignment with the corresponding webs 57 in wheel carrying member 21. It will be seen from FIGURE 6, and also from FIGURE 4, that, in a rest position, the spring 50 is approximately half seated on web 57 and half seated on web 56, with the axis of the spring lying in the plane of mating assembly, indicated in FIGURE 6 by the dashed line 60. It should be noted that the mating surfaces 54 and 55 of wheel carrying member 21 and mounting bracket member 22, respectively, do not actually meet at plane 60 but are spaced apart by a gap sufficient to insure relative rotation of the two members without any contact between their surfaces even under the roughest usage to which the wheel suspension may be subjected. The gap 61 is determined, of course, by the dimensions of the thrust bearing 31. It will also be noted that the O-ring seal 43 is sufficiently large to resiliently and tightly engage both surfaces 54 and 55 on opposite sides of the gap 61, thus assuring sealing protection of bearing 31.

FIGURES 7 and 8 show the position assumed by the spring 50, within the spring cavity 51 when wheel carrying member 21 is rotated relative to mounting bracket member 22 from the rest position illustrated in FIGURES 5 and 6. Such distortion may occur in either direction of rotation, in one direction when the wheel carried by the wheel suspension is displaced under load or shock conditions, and in the other direction when sudden reduction in the load or shock produces a rebound. In either case, the radial spring seating webs 56 and 57 are displaced from alignment, so that the spring 50 is compressed between a spring seat web 56, an integral part of body bracket member 22 and spring seat web 57a, an integral part of wheel carrying member 21, as seen in FIGURE 8. In FIGURE 8, only the right half of the upper end of spring 50 has seat engagement, and only the left half of the lower end of spring 50 has seat engagement; the upper web 57 of the wheel carrying member has lifted entirely free of the upper end of spring 50 and the lower web 56a of the mounting bracket member has dropped completely clear of the lower end of spring 50. Nevertheless, the spring 50 is confined to the same position and substantially the same longitudinal axis by the walls of the recesses 52 and 53.

The springs 50 which are illustrated and preferred are ordinary helical springs of the type employed in punch press dies. They are flat leaf in cross-section, and ground at each end to form a flat seating end. The term compression spring or helical spring will be used throughout the specification and claims, the term "compression spring" will be used to include any longitudinally compressible type of spring.

An important feature of the invention resides in the cross-section of the seating webs 56 and 57. As seen in FIGURES 3, 5, and 7, the web 56 (web 57 being merely a mirror image) increases greatly in thickness as it increases in radius. It is formed on each face to present a convex seating surface 62 to the adjacent end of the spring 50. (See FIGURES 5 and 6.) Approximately half of the concave spring seat is presented to the end of spring 50 by a half-domed convex seat 62 on web 56 and a mating half-domed convex seat 63 on the aligned mating web 57. Of course, under loaded conditions, the springs 50 seat at each end on only a half convex dome, as illustrated in FIGURE 8.

The convex seats 62 and 63 permit the spring 50 to slightly shift its position, when deformed, so that it can remain very nearly in a state of longitudinal compression only.

An examination of FIGURE 3, as well as FIGURES 5 to 8, will reveal that the springs 50 are disposed so their axes form the sides of a regular polygon concentric with the suspension axis of suspension pin 30. It is an important object of the invention that the springs 50 are subjected almost exclusively to longitudinal deformation along the sides of a polygon, rather than along the arc of a circle, and the convex seating provided by convex seats 62 and 63 achieve this to a practical if not mathematically perfect extent.

It will be understood from the foregoing description that the load rating for the wheel suspension constructed according to the present invention may be increased or decreased by the addition or subtraction of the interchangeable springs 50. It is not necessary for the operation of the wheel suspension of the invention that all of the spring cavities 51 be filled with springs 50. Thus, in the illustrated embodiment, a full complement of eight springs would be used for maximum loading of the wheel suspension, but only four springs, preferably distributed in alternate cavities 51, would be required for use at half maximum loading capacity. In all instances, however, the springs 50 would be substantially longitudinally deformed along axes lying in plane 60 and coinciding with the sides of a regular polygon, an octagon in the case of the illustrated embodiment.

It is very desirable for purposes of structural symmetry to bisect the spring 50 into equal halves, with the spring seated approximately half on web 56 and half on web 57. However, it will be understood that it is not absolutely essential to the operation of the invention that this be so. It would be possible, within the scope of the invention, to design a less desirable structure which would seat unequally in the two relatively rotatable members 21 and 22.

The wheel suspension of the invention has much greater rigidity in the steerable form 12 than has been found in most heretofore known suspensions of the same dimensions. At the same time, the suspension gives the wheel opportunity to ride upward and backward upon encountering surface irregularities. It will be seen from FIGURE 1 that the wheel is carried under and trailing the suspension axis, in both the steerable form 12 and the non-steerable form 14.

The cross-sectional view of FIGURE 4 reveals that substantially all vertical forces are transmitted from the wheel carrying member 21 to the suspension pin 30 through the tapered roller bearing 32. These forces are in turn transmitted to the king pin mounting bracket 23 through the king pin bearing supports 25 and 26, and also through the webbed extensions 25(a) and 26(a) which distribute the stress almost all the way across the inboard side of the mounting bracket 22 since they extend to a point forward of the suspension axis of suspension pin 30. In the embodiment illustrated, a locking key 70 (see FIGURE 4) is provided in the mounting bracket 23 to be received in a diametrical bore 71 in king pin 24 to prevent its rotation.

Not every embodiment is illustrated by the drawings herein. The principle of the invention does not reside in the particular form of embodiment, and the invention is not restricted to the exact form of construction shown in the accompanying drawings. The following claims are intended to include within their scope all those devices which embody the essential principles taught by the foregoing specification, even though there is a departure from the embodiment of the drawings to the extent of adding to it with improvement inventions, or to the extent of simply changing its parts in a manner which would be readily conceived by a mechanic in the course of constructing a device according to the following claims. Also, it is not my intention that the limitations of one claim be read into the invention as defined by any other claim.

What is claimed is:

1. A wheel suspension which includes: a mounting bracket member; a wheel carrying member mounted on said mounting bracket member to permit relative rotational oscillation about a suspension axis, said wheel carrying member having a wheel mounting location adapted to oscillate with said wheel carrying member about said suspension axis; a spring means having a longitudinal axis of compression and a seating end at each end of said longitudinal axis, said spring means being mounted between said relatively rotatable members with its axis in a plane normal to said suspension axis; a pair of walls integral with said mounting bracket member, said walls extending substantially radially from said suspension axis, and defining a partial housing for the reception between them of said spring means, said walls having a convex surface to seat said spring at each end over a seating area comprising only a part of the area of seating at each end of said spring means; a pair of walls integral with said wheel supporting member and extending radially from said suspension axis, said walls defining a partial housing for the reception between them of said spring means, and mating with said partial spring housing of said wheel carrying member, said walls having a convex surface to seat said spring at each end over a seating area comprising only a part of the area of seating at each end of said spring means; whereby said spring means is compressed between one of the pair of mounting bracket spring seat walls and one of the pair of wheel carrying member spring seat walls upon relative movement of said members about said suspension axis.

2. A wheel suspension which includes: a wheel axle; a mounting bracket member having an assembly surface normal to the axis of said wheel axle; a wheel carrying member for supporting said wheel axle, said wheel carrying member having an assembly surface normal to the axis of said wheel axle and mating with the assembly surface of said mounting bracket; a suspension shaft means holding said wheel carrying member in assembly with said mounting bracket member with the adjacent assembly surfaces of said members spaced apart from one another to permit rotational oscillation of said wheel carrying member relative to said mounting bracket about a suspension axis coinciding with the axis of said suspension shaft means; thrust bearing means coaxial with said suspension shaft means and received in mating annular recesses in the adjacent assembly surfaces of said members; counterthrust bearing means coaxial with said suspension shaft means to permit rotational oscillation of said wheel carrying member about said suspension shaft means; ring seal means coaxial with said suspension shaft means and closely received between said mating assembly surfaces external to said thrust bearing means; walls defining mating spring cavities in the adjacent assembly surfaces of said mounting bracket and said wheel carrying member, said recesses forming a plurality of spring cavities disposed substantially in a circle coaxial with said suspension axis and lying in a plane between said assembly surfaces; and coil springs enclosed within at least some of said spring cavities, each of said springs having each end partially overlapping said seating walls in said mounting bracket and said wheel supporting member respectively, whereby said springs are compressed by engagement between the walls of the recesses in said members upon movement of said wheel supporting member relative to said mounting bracket member.

3. A wheel suspension which includes: a mounting bracket member and a wheel carrying member pivotally connected at a common central point to permit relative rotational oscillation about a suspension axis, said members having adjacent mating surfaces; wheel mounting means carried on said wheel supporting member and adapted to mount a wheel for rotation about a wheel axis parallel to said suspension axis; walls in the adjacent mating surfaces of said two members, said walls defining an annular bearing recess concentric with said suspension axis; thrust bearing means concentric with said suspension axis and disposed in said annular bearing recess and engaging the walls thereof to space said mating surfaces apart from each other and permit the relative rotational oscillation of said two members; walls defining a plurality of mating spring recesses in the mating surfaces of said members, the adjacent recesses in each mating surface forming a spring cavity enclosed partially by each of said members, said spring cavities being disposed substantially in a circle concentric with said suspension axis; a helical spring in at least one of said spring cavities; and spring seating walls at each end of said spring cavities, said walls being formed of two substantially equal halves in the form of radial webs in each of said members adjacent said mating surfaces, each of said halves forming half a convex seat for aligning the axis of said spring with one side of a regular polygon concentric with said suspension axis, and said spring being seated at one end on the seating wall of one of said members over only part of the spring cross-section transverse to its axis, and being seated at the other end on the seating wall of the other of said members over only part of the spring cross-section transverse to its axis when said spring is compressed by relative movement of said two members about the suspension axis.

4. A wheel suspension which includes: a mounting bracket member and a wheel carrying member adapted to be assembled together in a manner to permit relative rotational oscillation about a suspension axis, said members having adjacent mating surfaces rotatable relative to each other about said suspension axis; wheel mounting means carried on said wheel supporting member and adapted to mount a wheel for rotation about a wheel axis parallel to said suspension axis; walls in said two members defining an annular bearing recess concentric with said suspension axis; thrust bearing means concentric with said suspension axis and disposed in said annular bearing recess and engaging the walls thereof to space the mating surfaces of said two members apart from each other; walls defining a plurality of mating spring recesses in the mating surfaces of said members, the adjacent recesses in each mating surface forming a spring cavity enclosed partially by each of said members, said spring cavities being disposed substantially in a circle lying in a plane normal to said suspension axis and concentric with said axis; helical springs in at least some of said spring cavities; and a pair of mating spring seating walls at each end of said cylindrical spring cavities, one on each of said members, each said seating wall forming a convex seat for one side of the adjacent end of one of said springs, both of said halves forming a convex seat for aligning the axis of one of said springs with one side of a regular polygon concentric with said suspension axis, and said spring being seated only on one side of its axis on the seating wall of one of said members and seated only on the opposite side of its axis on the seating wall on the other of said members when said spring is compressed by the relative movement of said two members about the suspension axis.

5. A wheel suspension which includes: a mounting bracket member and a wheel carrying member adapted to be assembled together in a manner to permit relative rotational oscillation about a suspension axis, said members having adjacent mating surfaces lying in planes normal to said suspension axis; a pivot pin passing through said members at the suspension axis and holding them in relatively rotatable assembly; wheel mounting means carried on said wheel supporting member and adapted to mount a wheel for rotation about a wheel axis parallel to said suspension axis; walls in said two members defining an annular bearing recess concentric with said suspension axis; thrust bearing means concentric with said suspension axis and disposed in said annular bearing recess and engaging the walls thereof to space the mating surfaces of said two members apart from each other; counter-thrust bearing means mounted on said pivot pin between said pin and one of said relatively rotatable members; lubricant conduit means in one of said members providing a lubricant conduit between the exterior of said member and said lubricant reservoir; walls defining a plurality of mating spring recesses in the mating surfaces of said members, the adjacent recesses in each mating surface forming a spring cavity enclosed partially by each of said members, said spring cavities being disposed substantially in a circle lying in a plane normal to said suspension axis and concentric with said axis; a helical spring in at least one of said spring cavities; and spring seating walls at each end of said spring cavities, said walls being formed of two substantially equal halves in the form of radial webs in each of said members adjacent said mating surfaces, both of said halves forming a convex seat for aligning the axis of said springs with one side of a regular polygon concentric with said suspension axis, and said spring being seated only on one side of its axis on the seating wall of one of said members and seated only on the opposite side of its axis on the seating wall on the other of said members when said spring is compressed by relative movement of said two members about said pivot pin.

6. A wheel suspension which includes: a mounting bracket member and a wheel carrying member adapted to be assembled together in a manner to permit relative rotational oscillation about a suspension axis, said members having adjacent mating surfaces lying in planes normal to said suspension axis; a pivot pin passing through said members at the suspension axis and holding them in relatively rotatable assembly; wheel mounting means carried on said wheel supporting member and adapted to mount a wheel for rotation about a wheel axis parallel to said suspension axis; walls in said two members defining an annular bearing recess concentric with said suspension axis; thrust bearing means concentric with said suspension axis and disposed in said annular bearing recess and engaging the walls thereof to space the mating surfaces of said two members apart from each other; counter-thrust bearing means mounted on said pivot pin between said pin and one of said relatively rotatable members; ring seal means concentric with said suspension axis and seating against said mating surfaces of said members, to seal said annular bearing recess and said thrust bearing means therein from the exterior of said wheel suspension; a wafer seal encircling said pivot pin exterior to said counter-thrust bearing and sealing, at its periphery, against the adjacent surface of the member carrying said counter-thrust bearing, walls defining a common lubricant reservoir communicating with both said thrust bearing means and said counter-thrust bearing; lubricant conduit means in one of said members providing a lubricant conduit between the exterior of said member and said lubricant reservoir; walls defining a plurality of mating spring recesses in the mating surfaces of said members, the adjacent recesses in each mating surface forming a substantially circular spring cavity enclosed partially by each of said members, said spring cavities being disposed substantially in a circle lying in a plane normal to said suspension axis and concentric with said axis; a helical spring in at least one of said spring cavities; and spring seating walls at each end of said spring cavities, said walls being formed of two substantially equal halves in the form of radial webs in each of said members adjacent said mating surfaces, both of said halves forming a convex seat for aligning the axis of said springs with one side of a regular polygon concentric with said suspension axis, and said spring being seated only on one side of its axis on the seating wall of one of said members and seated only on the opposite side of its axis on the seating wall on the other of said members when said spring is compressed by relative movement of said two members about said pivot pin.

7. A wheel suspension which includes: a mounting bracet member and a wheel carrying member adapted to be assembled together in a manner to permit relative rotational oscillation about a suspension axis, said members having adjacent mating surfaces lying in planes normal to said suspension axis; wheel mounting means carried on said wheel supporting member and adapted to mount a wheel for rotation about a wheel axis parallel to said suspension axis; walls in said two members defining an annular bearing recess concentric with said suspension axis; thrust bearing means concentric with said suspension axis and disposed in said annular bearing recess and engaging the walls thereof to space the mating surfaces of said two members apart from each other; ring seal means concentric with said suspension axis and seating against said mating surfaces of said members, to seal said annular bearing recess and said bearing means therein from the exterior of said wheel suspension; lubricant conduit means in one of said members providing a lubricant conduit between the exterior of said member and the interior of said bearing recess; walls defining a plurality of mating spring recesses in the mating surfaces of said members, the adjacent recesses in each mating surface forming a substantially circular spring cavity enclosed partially by each of said members, said spring cavities being disposed to form a circle lying in a plane normal to said suspension axis and concentric with said axis; helical springs in at least some of said spring cavities; spring seating walls at each end of said spring cavities, said walls being formed of two substantially equal halves in the form of radial webs in each of said members adjacent said mating surfaces, both of said halves forming a convex seat for aligning the axis of one of said springs with one side of a regular polygon concentric with said suspension axis, and said spring being seated only on one side of its axis on the seating wall of one of said members and seated only on the opposite side of its axis on the seating wall on the other of said members when said spring is compressed by relative movement of said two members about the suspension axis; upper and lower king pin bearing supports on the upper and lower parts of said mounting bracket member on one side of said suspension axis, bracing webs integral with said bracket member and said bearing supports and extending across said bracket member to the opposite side of said suspension axis to provide rigid bracing of said king pin bearings relative to said mounting bracket member; a king pin journaled in said king pin bearing supports; and a king pin bracket received between said upper and lower king pin bearing supports and pivotally supporting said mounting bracket member by means of said king pin, with the axis of said king pin disposed at an angle of camber with respect to the vertical.

8. A wheel suspension which includes: a mounting bracket member and a wheel-carrying member pivotally connected at a common suspension axis to permit relative rotational oscillation about said suspension axis, said members having adjacent mating surfaces; a wheel-mounting means on said wheel-carrying member for rotatably mounting a wheel thereon at an axis spaced from said suspension axis; walls in said adjacent mating surfaces defining a plurality of mating spring recesses, the adjacent recesses in each mating surface forming a spring cavity enclosed partially by each of said members, said spring cavities being disposed along the circumference of a circle concentric with said suspension axis; helical springs in at least some of said spring cavities adapted to resiliently resist relative rotational oscillation from said two members; spring seating walls at each end of said spring cavities, said walls being formed with convex spring-seating surfaces for reception into the end of a spring in said spring cavity; and an annular bearing between said mating surfaces and concentric with said suspension axis for holding said members in parallel alignment while permitting said rotational oscillation.

References Cited in the file of this patent

UNITED STATES PATENTS

| 893,794 | Girardot | July 21, 1908 |
| 1,043,827 | Hartley | Nov. 12, 1912 |

FOREIGN PATENTS

| 51,599 | Austria | Jan. 10, 1912 |
| 466,807 | Italy | Nov. 16, 1951 |